United States Patent [19]

Fukuda et al.

[11] 4,207,097
[45] Jun. 10, 1980

[54] LEAD ALLOY FOR LEAD-ACID BATTERIES AND PROCESS FOR PRODUCING THE ALLOY

[75] Inventors: Sadao Fukuda, Daito; Hidemi Fukunaga, Osaka; Hiroshi Kumano, Daito, all of Japan

[73] Assignee: Matsushita Electric Industrial Co., Ltd., Osaka, Japan

[21] Appl. No.: 969,556

[22] Filed: Dec. 14, 1978

[30] Foreign Application Priority Data

Dec. 23, 1977 [JP] Japan ................... 52-156892
Aug. 29, 1978 [JP] Japan ................... 53-106155

[51] Int. Cl.² .................................................. C22F 11/10
[52] U.S. Cl. ................... 75/166 D; 75/77; 75/166 E
[58] Field of Search .......... 75/166 D, 166 E, 77, 75/78

[56] References Cited

U.S. PATENT DOCUMENTS

| | | | |
|---|---|---|---|
| 2,551,116 | 5/1951 | Armand et al. .................. | 222/92 |
| 3,644,115 | 2/1972 | Hamaguchi et al. ............. | 75/134 B |
| 3,993,480 | 11/1976 | Ueberschaer et al. ........... | 75/166 C |

FOREIGN PATENT DOCUMENTS

| | | | |
|---|---|---|---|
| 541056 | 5/1957 | Canada ................... | 75/166 D |
| 44-23427 | 1/1969 | Japan ..................... | 75/166 D |
| 568073 | 3/1945 | United Kingdom ..... | 75/166 E |

OTHER PUBLICATIONS

Lead & Lead Alloys, Ed. W. Hoffman, Springer, N.Y., 1970, pp. 139-144; 341-357.

*Primary Examiner*—L. Dewayne Rutledge
*Assistant Examiner*—Upendra Roy
*Attorney, Agent, or Firm*—Joseph W. Farley

[57] ABSTRACT

An alloy consisting predominantly of lead and containing 0.1 to 3.0% by weight of tin, 0.1 to 0.3% by weight of arsenic and 0.01 to 0.1% by weight of aluminum or copper. The alloy may further contain 0.002 to 1.0% by weight of cadmium. The alloy is useful for grids, intercell connectors and poles to provide lead-acid batteries less prone to self-discharge and capable of withstanding over discharge.

5 Claims, 1 Drawing Figure

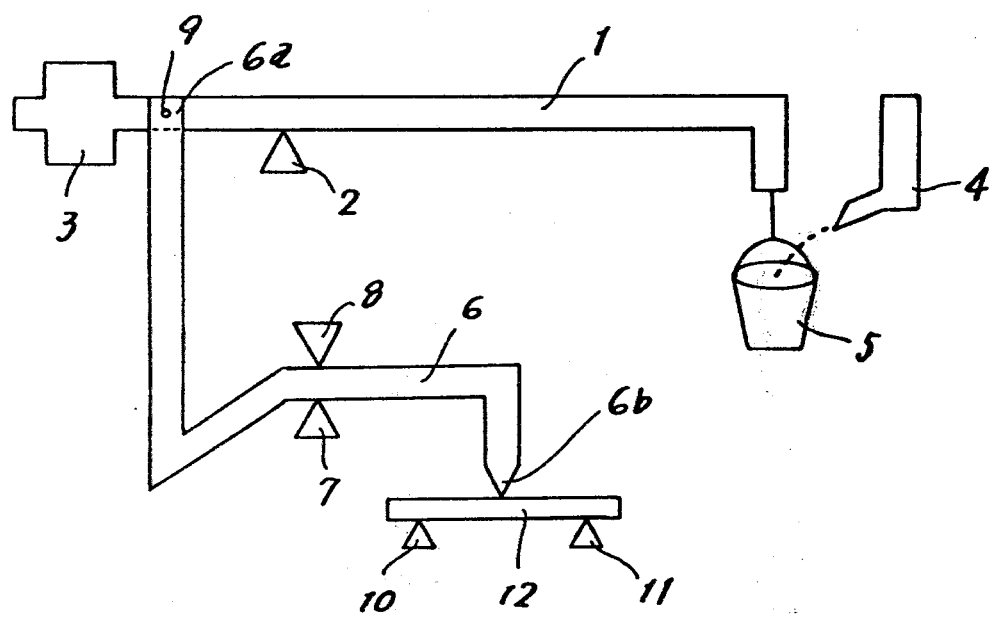

LEAD ALLOY FOR LEAD-ACID BATTERIES AND PROCESS FOR PRODUCING THE ALLOY

The present invention relates to lead alloys useful for grids, inter-cell connectors, poles and the like, especially grids, of lead-acid batteries and a process for producing the alloys.

In lead-acid batteries comprising lead dioxide positive plates, lead negative plates and a sulfuric acid electrolyte, Pb-Sb or Pb-Ca alloys are usually used for grids serving as current collectors for collecting the current resulting from the electrochemical cell reaction. The grid must also act to retain the active material, namely $PbO_2$ or Pb, on the plate. For these purposes, the grid must fulfil the requirements of:

(a) Having a high electroconductivity.

(b) Having high mechanical strength to retain the active material and to be amenable to the production process including pasting of the active materials, formation of the plates and assembling step.

(c) Producing no adverse effect on the performance of the battery, permitting the battery to have a low self-discharge rate and withstand over discharge.

(d) Being easy to make by a simple method.

(e) Being inexpensive.

The Pb-Sb alloy heretofore used chiefly for lead-acid batteries still remains to be improved in respect of the requirement (c) given above in that Sb allows the battery to undergo marked self-discharge because of the low hydrogen over-potential involved and is liable to permit the evolution of hydrogen gas during charge, resulting in an increased reduction in the amount of water contained in the electrolyte. The Pb-Ca alloy used to overcome these drawbacks has problems with respect to the requirements (c) and (d). When subjected to deep discharge (namely discharge to a very low battery voltage, which may synonymously be expressed as "over discharge"), lead-acid batteries incorporating Pb-Ca alloy grids encounter difficulty in the subsequent charge, hence a reduced capacity. The same phenomenon occurs if the batteries are allowed to stand as discharged. Such a battery, when put to actual use, therefore necessitates the use of a device for controlling the cut-off voltage of discharge. This renders the battery costly as a power source.

To remedy these disadvantages, Pb-Sn-As alloy has been proposed which has the advantages of possessing fairly good mechanical properties, ensuring inhibited self-discharge when used for batteries and having a prolonged over-discharge cycle life involving deep discharge. Nevertheless, it has been found that when the alloy is cast into a grid, cracks are liable to develop in the grid during the casting process. The grid will then be unable to hold the active material effectively and will have a lower current collecting ability. Additionally the over discharge cycle life of the battery will be substantially shorter than is achieved by controlling the cut-off voltage of discharge.

The main object of this invention is to provide an alloy for use in lead-acid batteries which is more effective than the conventional Pb-Sb alloy in reducing self-discharge and minimizing the reduction of the electrolyte, gives the battery a higher ability to withstand over discharge than the known Pb-Ca alloy, and is free of cracking during casting unlike the proposed Pb-Sn-As alloy.

Another object of this invention is to provide, as a preferred embodiment, a lead alloy for affording lead-acid batteries which are inexpensive as power sources.

In order to fulfil these objects, the present invention provides improvements in the Pb-Sn-As alloy mentioned above.

As already stated, the Pb-Sn-As alloy is susceptible to cracking when cast into products such as a grid. In an attempt to inhibit the cracking, we conducted research on the casting conditions, for example, by using varying molten metal temperatures or varying mold temperatures and adding the constituent metals in various orders. The research achieved some but no fundamental improvements.

Subsequently we prepared alloys of this type with addition of other elements to check the resulting crack inhibiting effects. As a result, aluminum, zinc, copper and cerium were found effective in inhibiting cracking. However, the alloys containing Zn or Ce failed to meet the requirement (c) because the use of such alloys for the grid entailed a great weight reduction due to anodic oxidation, leading to a shortened cell life.

Based on these findings, we made further research on alloys of the Pb-Sn-As type incorporating Al or Cu and found that the alloys were almost free of any cracking and gave as high a battery performance as is achieved without use of such additional metal.

The present invention provides a lead alloy comprising 0.1 to 3.0% by weight of Sn, 0.1 to 0.3% by weight of As, 0.01 to 0.1% by weight of Al or Cu and the balance Pb. The alloy of the above composition may further incorporate 0.002 to 1.0% by weight of Cd. (The percentages in the following description are all by weight unless otherwise specified.)

Embodiments of this invention will be described in detail with reference to the accompanying drawing which is a diagram showing an apparatus for measuring the deflection strength of the lead alloys according to this invention.

Lead is placed in an alumina container and heated to about 700° C. in an atmosphere of argon gas. (Although an inert atmosphere is not especially needed, the argon-gas atmosphere is used to ensure accuracy.) A specified amount of Al (which may be in the form of plates, blocks or granules) is added to the molten metal, and the mixture is fully stirred. The Al added is heated to about 700° C. because Al, which is covered with a very thin oxide film, will have difficulty in forming alloys with Pb at temperatures below the melting point of Al. When thus heated at a temperature of not lower than the melting point, the Al enclosed with the oxide film melts and flows out of the film to come into contact with the molten Pb, forming an alloy. The temperature is not limited to 700° C. insofar as it is not lower than the melting point of Al. Although Sn and As can be added to the molten alloy at the same temperature, they are added after the alloy has been cooled to 500° C., i.e. casting temperature, since higher temperatures entail marked oxidation and evaporation of the metals. As is added in the same manner as the addition of As to usual Pb-Sb alloys, namely by preparing a Pb alloy of a high As content (termed "base alloy") and adding the base alloy to the melt in such an amount that the resulting alloy will contain the specified quantity of As. While Pb-Sn-As-Al alloys are prepared by the above procedure, Pb-Sn-As-Cu alloys are prepared by adding Sn, As and Cu to Pb heated to 500° C. The molten alloys thus prepared are poured into molds heated to about 150° C. and each dimensioned to provide a casting in the form of a strip measuring 20 mm in width, 100 mm in length and 2 mm in thickness. The alloys are maintained in the molds for about 10 seconds, then withdrawn and cooled in the atmosphere. The resulting specimens are heat-treated at a temperature of 50° C., 70° C., 100° C., 120° C., 150° C., 170° C., 210° C. or 250° C. for 5 hours and thereafter cooled in the atmosphere.

The specimens are tested for deflection strength which is one of mechanical properties with the use of an apparatus. The apparatus will be described below briefly with reference to the drawing. A bar 1 turnably supported on a fulcrum 2 has a weight 3 at one end and is provided at the other end with a container 5 for receiving copper powder from a container 4. A pressing bar 6 turnably supported by fulcrums 7, 8 has an upper end 6a pivoted by a pin 9 to the bar 1 and a lower end 6b in contact with the midportion of a specimen 12 horizontally supported on fulcrums 10, 11. Copper powder is fed to the container 5 at a given rate, causing the lower end 6b of the pressing bar 6 to apply pressure to the specimen 12. When the specimen 12 has been bent by a predetermined dimension, the supply of the copper powder to the container 5 is halted. The weight of the copper powder in the container 5 is measured to determine the deflection strength. Table 1 shows the results obtained for the Pb-Sn-As alloys, and Table 2 those for the Pb-Sn-As-Al alloys and Pb-Sn-As-Cu alloys.

Table 1

| Alloy | Crack | As cast | Deflection strength (kg/cm$^2$) Heat-treatment temp. after casting (°C.) | | | | | | | |
|---|---|---|---|---|---|---|---|---|---|---|
| | | | 50 | 70 | 100 | 120 | 150 | 170 | 210 | 250 |
| Pb-0.05%Sn-0.05%As | O | 170 | 170 | 169 | 172 | 170 | 169 | 173 | 172 | 176 |
| Pb-0.1%Sn-0.05%As | O | 170 | 169 | 170 | 181 | 180 | 179 | 175 | 186 | 187 |
| Pb-0.3%Sn-0.05%As | O | 173 | 172 | 171 | 177 | 176 | 169 | 169 | 169 | 185 |
| Pb-0.5%Sn-0.05%As | O | 182 | 180 | 182 | 185 | 182 | 176 | 193 | 189 | 188 |
| Pb-1.0%Sn-0.05%As | O | 191 | 191 | 193 | 190 | 190 | 188 | 179 | 198 | 200 |
| Pb-3.0%Sn-0.05%As | O | 211 | 214 | 216 | 202 | 200 | 211 | 231 | 209 | 203 |
| Pb-5.0%Sn-0.05%As | O | 199 | 200 | 200 | 196 | 203 | 200 | 215 | 221 | 216 |
| Pb-0.05%Sn-0.1%As | O | 170 | 169 | 169 | 200 | 216 | 229 | 231 | 210 | 169 |
| Pb-0.1%Sn-0.1%As | X | 195 | 193 | 273 | 289 | 315 | 341 | 395 | 316 | 210 |
| Pb-0.3%Sn-0.1%As | X | 199 | 200 | 394 | 403 | 405 | 418 | 453 | 303 | 194 |
| Pb-0.5%Sn-0.1%As | X | 189 | 186 | 403 | 416 | 438 | 469 | 450 | 338 | 183 |
| Pb-1.0%Sn-0.1%As | X | 206 | 201 | 462 | 458 | 479 | 478 | 439 | 320 | 206 |
| Pb-3.0%Sn-0.1%As | X | 218 | 212 | 451 | 462 | 515 | 539 | 482 | 360 | 211 |
| Pb-5.0%Sn-0.1%As | X | 210 | 206 | 443 | 455 | 499 | 500 | 462 | 453 | 205 |
| Pb-0.05%Sn-0.3%As | X | 173 | 170 | 190 | 198 | 206 | 200 | 231 | 183 | 170 |
| Pb-0.1%Sn-0.3%As | X | 216 | 203 | 316 | 333 | 339 | 386 | 403 | 309 | 211 |
| Pb-0.3%Sn-0.3%As | X | 232 | 219 | 466 | 496 | 531 | 556 | 603 | 411 | 230 |
| Pb-0.5%Sn-0.3%As | X | 219 | 206 | 498 | 506 | 565 | 591 | 599 | 400 | 219 |
| Pb-1.0%Sn-0.3%As | X | 232 | 230 | 516 | 553 | 593 | 668 | 632 | 411 | 221 |
| Pb-3.0%Sn-0.3%As | X | 231 | 229 | 503 | 596 | 600 | 670 | 606 | 392 | 230 |
| Pb-5.0%Sn-0.3%As | X | 240 | 239 | 500 | 583 | 606 | 632 | 568 | 368 | 233 |

"O" stands for cracking,
"X" no cracking, the same as hereinafter.

Table 2

| Alloy | Crack | As cast | Deflection strength (kg/cm$^2$) Heat-treatment temp. after casting (°C.) | | | | | | | |
|---|---|---|---|---|---|---|---|---|---|---|
| | | | 50 | 70 | 100 | 120 | 150 | 170 | 210 | 250 |
| Pb-0.5%Sn-0.3%As-0.005%Al | X | 221 | 220 | 480 | 501 | 543 | 583 | 562 | 388 | 220 |
| Pb-0.5%Sn-0.3%As-0.01%Al | O | 219 | 220 | 496 | 506 | 515 | 563 | 555 | 396 | 216 |
| Pb-0.5%Sn-0.3%As-0.03%Al | O | 222 | 221 | 488 | 518 | 500 | 582 | 563 | 405 | 213 |
| Pb-0.5%Sn-0.3%As-0.05%Al | O | 224 | 215 | 513 | 496 | 515 | 596 | 600 | 411 | 223 |
| Pb-0.5%Sn-0.3%As-0.1%Al | O | 231 | 223 | 506 | 514 | 533 | 603 | 599 | 400 | 229 |
| Pb-0.5%Sn-0.3%As-0.3%Al | O | 221 | 219 | 502 | 501 | 509 | 556 | 600 | 399 | 223 |
| Pb-0.5%Sn-0.3%As-0.005%Cu | X | 239 | 239 | 496 | 519 | 555 | 693 | 668 | 395 | 238 |
| Pb-0.5%Sn-0.3%As-0.01%Cu | O | 231 | 242 | 513 | 555 | 583 | 695 | 703 | 402 | 241 |
| Pb-0.5%Sn-0.3%As-0.03%Cu | O | 239 | 239 | 554 | 584 | 625 | 705 | 700 | 395 | 252 |
| Pb-0.5%Sn-0.3%As-0.05%Cu | O | 243 | 218 | 563 | 596 | 689 | 699 | 701 | 432 | 255 |
| Pb-0.5%Sn-0.3%As-0.1%Cu | O | 276 | 260 | 564 | 581 | 654 | 666 | 695 | 411 | 289 |
| Pb-0.5%Sn-0.3%As-0.3%Cu | O | 259 | 243 | 560 | 590 | 669 | 700 | 700 | 403 | 298 |
| Pb-0.5%Sn-0.3%As-0.5%Cu | O | 258 | 239 | 553 | 576 | 632 | 669 | 670 | 400 | 299 |
| Pb-1.0%Sn-0.1%As-0.05%Al | O | 219 | 210 | 458 | 462 | 481 | 499 | 466 | 321 | 230 |
| Pb-1.0%Sn-0.1%As-0.05%Cu | O | 233 | 232 | 493 | 503 | 509 | 688 | 690 | 400 | 251 |

"O" stands for cracking.
"X" no cracking.

The surfaces of the specimens were checked for cracking, with the results also shown in the above tables. The specimens in which a crack is found to have developed on casting and those in which a crack has developed after the deflection strength measurement are deemed to be cracked specimens.

Tables 1 and 2 reveal that the Pb alloys containing at least 0.1% of Sn and at least 0.1% of As have improved deflection strength. Of these elements, As content should preferably be limited to 0.3% if highest to minimize the evolution of arsine, a toxic gas. The results achieved with the specimens do not indicate a particular upper limit for the Sn content. When containing 0.1% or more of As, the Pb-Sn-As alloys are susceptible to cracking, which however can be inhibited by the addition of Al or Cu. Most optimally the amount of Al is at least 0.01% to inhibit cracking but up to 0.3% in view of the quantity in which Al can form alloys with Pb. Similarly the lower limit of the Cu content is 0.01% to ensure a cracking inhibiting effect, while the upper limit thereof is preferably 0.3% because Cu requires a prolonged period of time when forming alloys with Pb and also in view of the amount of Cu which can be used for Pb alloys.

To determine the conditions for producing alloys having high mechanical properties and outstanding corrosion resistance, investigations are carried out on the temperature of molten alloys, the temperature of the mold, the time during which the alloy is retained in the mold, the method of cooling the alloy withdrawn from the mold and heat-treatment conditions. The alloys used are Pb-Sn-As base alloys incorporating Al or Cu. A description will be given of Pb—0.5%Sn—0.3%As alloy and Pb—0.5%Sn—0.3%As—0.05%Al alloy as typical examples. Pb is placed in an alumina container and heated to a predetermined temperature in an atmosphere of argon gas. Specified amounts of Sn, As and Al are admixed with the molten metal. The resulting alloys are poured into molds maintained at a predetermined temperature, retained in the molds for varying periods of time and then withdrawn for cooling. The cast alloys are cooled in the atmosphere at room temperature or in water maintained at room temperature. The use of such water or air at room temperature is not particularly limitative; also usable are, for example, oils, cooled air and cooled metals. Useful cooling media are those which will not stain the surfaces of specimens and which assure the desired cooling speed and a uniform cooling speed. Therefore cooling media are preferable which have good heat conductivity and which will not react directly with Pb or adhere to the alloy surface or which will not adversely affect the performance of batteries even if reactive with Pb or adherent to the alloy surface. The alloys are cast in the form of a grid usually used for pasted plates.

The specimens obtained are tested for deflection strength and also for corrosion resistance, one of the important properties for services as grids for lead-acid batteries. The deflection strength measurement is conducted in the same manner as above but the specimens are of different construction. The specimens are tested for corrosion with the use of two pasted Pb-Ca negative plates (with a larger discharge capacity than the specimen plates) as the opposed electrodes and a sulfuric acid electrolyte having a specific gravity of 1.28, by applying constant voltage of 3.0 V across the specimen plates and the negative plates for 2 hours to oxidize the specimen plates, then discharging the battery through a specified resistor until the voltage drops to about 0.3 V, repeating the charge-discharge cycle, withdrawing the specimen plates from the electrolyte when the combined oxidizing time has amounted to 240 hours, immersing the plates in an aqueous solution containing 100 g/liter of KOH, 20 g/liter of mannitol and 10 g/liter of hydrazine-di-hydrochloride after washing with water to remove the oxide, washing the plates with water, drying the wet plates and measuring the weight of the plates to determine the weight reduction due to the oxidation. The weight reduction is expressed in $mg/dm^2/day$. Table 3 exemplifies the results. Table 4 shows the relation established between the temperature of cooling water, and the deflection strength and corrosion resistance for the specimens cooled with the water immediately after casting.

Table 3

| Alloy | Melting temp. (°C.) | Mold Temp. (°C.) | Mold Time* (sec) | Cooling means | Deflection strength ($kg/cm^2$) | Weight reduction ($mg/dm^2/day$) |
|---|---|---|---|---|---|---|
| Pb<br>\|<br>0.5%Sn<br>\|<br>0.3%As | 700 | 200 | 10 | air | 263 | 523 |
| | " | 150 | 10 | " | 258 | 476 |
| | 500 | 200 | 5 | " | 271 | 456 |
| | " | " | 10 | " | 269 | 465 |
| | " | " | 10 | water | 603 | 571 |
| | " | " | 30 | air | 252 | 457 |
| | " | 150 | 5 | " | 243 | 410 |
| | " | " | 10 | " | 240 | 422 |
| | " | " | 10 | water | 615 | 515 |
| | " | " | 30 | air | 253 | 418 |
| Pb<br>\|<br>0.5%Sn<br>\|<br>0.3%As<br>\|<br>0.05%Al | 700 | 200 | 10 | air | 249 | 509 |
| | " | 150 | 10 | " | 240 | 482 |
| | 500 | 200 | 5 | air | 252 | 465 |
| | " | " | 10 | " | 243 | 423 |
| | " | " | 10 | water | 591 | 516 |
| | " | " | 30 | air | 224 | 418 |
| | " | 150 | 5 | " | 232 | 425 |
| | " | " | 10 | " | 230 | 415 |
| | " | " | 10 | water | 564 | 509 |
| | " | " | 30 | air | 220 | 418 |

*Retention time of the alloy in the mold.

Table 4

| Alloy | Melting temp. (°C.) | Mold Temp. (°C.) | Mold Time* (sec) | Cooling water temp. (°C.) | Deflection strength ($kg/cm^2$) | Weight reduction ($mg/dm^2/day$) |
|---|---|---|---|---|---|---|
| Pb<br>\|<br>0.5%Sn<br>\|<br>0.3%As | 500 | 150 | 10 | 1 | 620 | 509 |
| | " | " | " | 10 | 613 | 521 |
| | " | " | " | 20 | 615 | 515 |
| | " | " | " | 50 | 543 | 501 |
| | " | " | " | 70 | 436 | 483 |
| | " | " | " | 100 | 326 | 458 |

Table 4-continued

| Alloy | Melting temp. (°C.) | Mold Temp. (°C.) | Mold Time* (sec) | Cooling water temp. (°C.) | Deflection strength (kg/cm$^2$) | Weight reduction (mg/dm$^2$/day) |
| --- | --- | --- | --- | --- | --- | --- |
| Pb | 500 | 150 | 10 | 1 | 573 | 517 |
| \| | " | " | " | 10 | 570 | 510 |
| 0.5%Sn | " | " | " | 20 | 564 | 509 |
| \| | " | " | " | 50 | 500 | 486 |
| 0.3%As | " | " | " | 70 | 413 | 462 |
| \| 0.05%Al | " | " | " | 100 | 330 | 430 |

*Retention time of the alloy in the mold.

These tables reveal the following. There is little or no relation between the deflection strength or corrosion resistance and the melting temperature, the temperature of the mold or the time during which the alloy is retained in the mold. Relatively rapid cooling immediately following the withdrawal of the alloy from the mold is effective in giving enhanced deflection strength. The lower the temperature of the cooling medium, the higher is the deflection strength afforded but the greater is the weight reduction due to the oxidation.

The great weight reduction appears to us attributable to the internal stress created in the structure of the alloy, so that the effects of heat treatment are investigated. Pb-0.5%Sn-0.3%As alloy and Pb-0.5%Sn-0.3%As-0.05%Al alloy are prepared, heated to 500° C., poured into molds heated to 150° C., withdrawn from the molds in 10 seconds and thereafter cooled in the atmosphere at room temperature or in water maintained at room temperature. Subsequently the specimens are heated in a furnace at 30° C., 50° C., 100° C., 150° C., 200° C. or 250° C. for 5 hours, then withdrawn from the furnace and cooled in the atmosphere at room temperature or water at room temperature. The specimens are tested for deflection strength and weight reduction due to oxidation in the same manner as above. Table 5 shows the results.

Table 5 reveals that the specimens cooled with water immediately after withdrawal from the mold, when futher heated and then cooled in the atmosphere at room temperature, involves a reduced weight reduction while retaining deflection strength and that those cooled in the atmosphere at room temperature after withdrawal from the mold have somewhat improved deflection strength when heated and thereafter slowly cooled or have further improved deflection strength when cooled with water at room temperature after heating.

To sum up, these results indicate the following. The cast alloys released from the mold are given improved deflection strength but involve a marked weight reduction due to oxidation when quenched with a cooling medium such as water. When further heat-treated at a temperature of 50° to 200° C. and thereafter slowly cooled as with air, the alloys are subject to only reduced weight reduction while retaining the improved deflection strength.

The alloys released from the mold and then slowly cooled as with air undergo a ruduced weight reduction due to oxidation but have lower deflection strength. When the cooled alloys are heated to 50° to 200° C. and quenched as with water, the alloys have improved deflection strength but are subject to an increased weight Table 5

| Alloy | Cooling means | Heat treatment temp. (°C.) | Cooling after heat treatment | | | |
| --- | --- | --- | --- | --- | --- | --- |
| | | | Air | | Water | |
| | | | Deflection strength (kg/cm$^2$) | Weight reduction (mg/dm$^2$/day) | Deflection strength (kg/cm$^2$) | Weight reduction (mg/dm$^2$/day) |
| Pb | Air | 30 | 258 | 433 | 306 | 439 |
| \| | " | 50 | 362 | 415 | 368 | 483 |
| 0.5%Sn | " | 100 | 415 | 408 | 516 | 502 |
| \| | " | 150 | 482 | 405 | 613 | 515 |
| 0.3%As | " | 200 | 460 | 410 | 595 | 500 |
| | " | 250 | 419* | 438 | 480* | 562 |
| | Water | 30 | 600 | 503 | 598 | 503 |
| | " | 50 | 613 | 486 | 620 | 475 |
| | " | 100 | 620 | 435 | 617 | 466 |
| | " | 150 | 618 | 459 | 618 | 502 |
| | " | 200 | 619 | 463 | 615 | 499 |
| | " | 250 | 511* | 503 | 503* | 539 |
| Pb | Air | 30 | 241 | 412 | 299 | 425 |
| \| | " | 50 | 389 | 406 | 390 | 438 |
| 0.5%Sn | " | 100 | 463 | 395 | 493 | 495 |
| \| | " | 150 | 439 | 386 | 605 | 503 |
| 0.3%As | " | 200 | 486 | 403 | 584 | 506 |
| \| 0.05%Al | " | 250 | 327* | 439 | 419* | 513 |
| | Water | 30 | 570 | 503 | 579 | 506 |
| | " | 50 | 581 | 465 | 606 | 493 |
| | " | 100 | 593 | 453 | 619 | 482 |
| | Water | 150 | 595 | 486 | 598 | 506 |
| | " | 200 | 567 | 499 | 589 | 478 |
| | " | 250 | 316* | 518 | 419* | 525 |

*The asterisk stands for a specimen in which a crack has developed when tested for deflection strength.

reduction due to oxidation. When further heated to 50° to 200° C. and subsequently slowly cooled, the alloys will involve a reduced weight reduction while retaining the improved deflection strength.

Although the results described above are achieved with the use of Pb-Sn-As alloys and Pb-Sn-As-Al alloys, the same results can be attained with alloys containing Pb, Sn and As.

The same alloys as used above are further tested to determine whether or not the alloys, when actually used as grids for lead-acid batteries, will achieve the same effects as produced by the specimens. Based on the foregoing results, a number of alloys are prepared under selected casting conditions and heat-treatment conditions and examined for battery characteristics. The results achieved by typical examples will be described below.

Table 6 shows the compositions of the typical alloys. Pb is heated to about 500° C. in an atmosphere of argon gas. (For the preparation of Al-containing alloys, Pb is heated to about 700° C., Al is added to Pb and the resulting alloy is cooled to about 500° C.) The specified metals are added to the molten metal to provide each of the desired compositions. The composition is poured into molds heated to about 150° C., and cast pieces are withdrawn therefrom, cooled with water, then heat-treated at about 150° C. for 5 hours and cooled in the atmosphere at room temperature to obtain grids of usual construction measuring 25 mm in width, 36 mm in height and 2 mm in thickness, and 25 mm in width, 36 mm in height and 1.5 mm in thickness. Active materials are applied to the grids in the usual manner, then dried and subjected to electrolysis to obtain electrodes plates. Those 2 mm in the thickness of the grid are used as positive plates, and the others as negative plates. Cells are fabricated by fitting four positive plates and five negative plates together with separators interposed therebetween and using a sulfuric acid electrolyte having a specific gravity of 1.28. Cells are also fabricated without substantially using any separator but using a colloidal electrolyte or glass wool impregnated with a liquid sulfuric acid electrolyte for retaining the electrolyte thereon, the cells otherwise having the same construction as above. The latter cells are found to have the same performance as the former, so that a description will be given below only of the test results achieved with the use of the former cells incorporating a sulfuric acid electrolyte having a specific gravity of 1.28. The batteries with such cells are charged with a current of 240 mA for 15 hours and discharged at a current of 480 mA to determine the initial capacity, with the result that the batteries are found to have substantially the same initial capacity irrespective of the kind of the grid alloy used. The batteries are tested for the following properties.

(1) After having been fully charged, the battery is allowed to stand as it is at about 40° C., and the capacity is measured in 1 month and also in 3 months to determine the self-discharge rate.

(2) The battery is charged at a constant voltage of 2.5 V/cell for 16 hours and discharged for 8 hours at a constant resistivity of 5 ohms/cell. This cycle is repeated to determine the cycle life. The cycle life is expressed in terms of the number of the cycles which have reduced the capacity to one half the initial level. The capacity is determined by measuring the duration of discharge resulting in a discharge voltage of 1.8 V/cell. The discharge at a constant resistivity of 5 ohms/cell for 8 hours eventually results in a voltage of 0.3 to 0.6 V/cell.

(3) During the test (2), the frequency of replenishment of liquid (water) needed for the first 50 cycles is measured. (The battery is equipped with a usual cap.)

(4) The battery is charged with a current at a rate 0.1 C for 6 days and discharged for 20 hours at a resistivity which will permit the flow of current corresponding to the rate 0.1 C. This cycle is repeated to determine the number of the cycles repeated by which the duration of discharge, resulting in a discharge voltage of 1.8 V/cell, has been reduced to one half the initial value.

For reference, tests are also conducted on batteries including Pb-5.0%Sb-0.3%As or Pb-0.1%Ca grids. The test results are listed in Table 6.

Table 6

| Alloy | Self-discharge rate (%) 1 Month | Self-discharge rate (%) 3 Months | Cycle life (∞) | Frequency of water replenishment (times) | Over-discharge cycle life (∞) |
|---|---|---|---|---|---|
| Pb-0.1%Sn-0.1%As | 19 | 40 | 76 | 0 | 6 |
| Pb-5.0%Sn-0.1%As | 20 | 47 | 31* | 0 | 3* |
| Pb-0.1%Sn-0.3%As | 20 | 40 | 81 | 0 | 8 |
| Pb-0.5%Sn-0.3%As | 21 | 39 | 94 | 0 | 10 |
| Pb-3.0%Sn-0.3%As | 22 | 41 | 92 | 0 | 9 |
| Pb-5.0%Sn-0.3%As | 21 | 42 | 26* | 0 | 3* |
| Pb-0.5%Sn-0.3%As-0.01%Al | 20 | 36 | 97 | 0 | 19 |
| Pb-0.5%Sn-0.3%As-0.3%Al | 20 | 39 | 99 | 0 | 24 |
| Pb-0.5%Sn-0.3%As-0.01%Cu | 22 | 40 | 92 | 0 | 19 |
| Pb-0.5%Sn-0.3%As-0.3%Cu | 25 | 44 | 90 | 0 | 19 |
| Pb-0.1%Sn-0.1%As-0.1%Al | 20 | 39 | 71 | 0 | 17 |
| Pb-3.0%Sn-0.3%As-0.1%Al | 21 | 40 | 96 | 0 | 26 |
| Pb-0.1%Sn-0.1%As-0.1%Cu | 23 | 42 | 74 | 0 | 16 |
| Pb-3.0%Sn-0.3%As-0.1%Cu | 24 | 44 | 99 | 0 | 22 |
| Pb-5.0%Sb-0.3%As | 46 | 77 | 82 | 2 | 3* |
| Pb-0.1%Ca | 15 | 37 | 14 | 0 | 16 |

*Short-circuiting.

Table 6 shows that batteries have a shorter cycle life when including plates incorporating not less than 5.0% of Sn. Disassembling of the batteries concerned has revealed that this is attributable to internal short-circuiting.

The results listed indicate that the use of the Pb-Sn-As-Al or Pb-Sn-As-Cu alloys of this invention provides remarkable improvements in self-discharge rate over Pb-Sb alloys and affords a longer cycle life over Pb-Ca alloys where deep discharge is involved. Al and Cu are found effective in giving improved over-charge characteristics. Whereas the batteries in which Pb—5.0%Sb—0.3%As alloys are used require the replenishment of water twice during the period of 50 cycles, those including other alloys necessitate no replenishment and are therefore easy to maintain. Thus the alloys of this invention are free of the drawbacks of the conventional batteries in which Pb-Sb and Pb-Ca alloys are used, affording lead-acid batteries which are outstanding in over-all performance.

The alloys of this invention are comparable to the conventional Pb-Ca alloys in the cycle life involving deep discharge where the cut-off voltage of discharge is controlled. However, whereas the Pb-Ca alloys have a life of about 14 cycles when such control means is not used, the alloys of this invention have a cycle life which is about 7 times as long as that life. While this invention contemplates provision of power sources at a reduced cost, this object can be fulfilled, for example, by eliminating the necessity of using the above-mentioned control means heretofore needed for Pb-Ca alloys. To this end, there arises the need to render the battery operable over a prolonged cycle life without resorting to any means for controlling the cut-off voltage of discharge. In an attempt to improve the cycle life, we have made research on Pb-Sn-As-Al and Pb-Sn-As-Cu alloys incorporating various other metals added thereto and found that Cd is effective as will be described below.

The alloys of the compositions listed in Table 7 are prepared and tested in the same manner as already described.

Table 7

| Alloy | Cycle life (∞) | Self-discharge rate (%) | |
|---|---|---|---|
| | | 1 Month | 3 Months |
| Pb-0.5%Sn-0.3%As-0.1%Al-0.005%Cd | 102 | 20 | 38 |
| Pb-0.5%Sn-0.3%As-0.1%Al-0.01%Cd | 109 | 20 | 37 |
| Pb-0.5%Sn-0.3%As-0.1%Al-0.02%Cd | 125 | 21 | 38 |
| Pb-0.5%Sn-0.3%As-0.1%Al-0.05%Cd | 137 | 23 | 41 |
| Pb-0.5%Sn-0.3%As-0.1%Al-0.1%Cd | 139 | 22 | 42 |
| Pb-0.5%Sn-0.3%As-0.1%Al-0.3%Cd | 128 | 23 | 40 |
| Pb-0.5%Sn-0.3%As-0.1%Al-0.5%Cd | 126 | 22 | 42 |
| Pb-0.5%Sn-0.3%As-0.1%Al-1.0%Cd | 131 | 23 | 42 |
| Pb-0.5%Sn-0.3%As-0.1%Al-3.0%Cd | 61* | 26 | 44 |
| Pb-0.5%Sn-0.3%As-0.05%Cu-0.005%Cd | 97 | 20 | 40 |
| Pb-0.5%Sn-0.3%As-0.05%Cu-0.01%Cd | 99 | 21 | 42 |
| Pb-0.5%Sn-0.3%As-0.05%Cu-0.02%Cd | 116 | 22 | 43 |
| Pb-0.5%Sn-0.3%As-0.05%Cu-0.05%Cd | 129 | 23 | 41 |
| Pb-0.5%Sn-0.3%As-0.05%Cu-0.1%Cd | 143 | 22 | 41 |
| Pb-0.5%Sn-0.3%As-0.05%Cu-0.3%Cd | 128 | 23 | 44 |
| Pb-0.5%Sn-0.3%As-0.05%Cu-0.5%Cd | 131 | 22 | 43 |
| Pb-0.5%Sn-0.3%As-0.05%Cu-1.0%Cd | 130 | 24 | 42 |
| Pb-0.5%Sn-0.3%As-0.05%Cu-3.0%Cd | 62* | 25 | 45 |

*Short circuiting

Table 7 shows, for illustrative purposes, the cycle life, involving deep discharge, of batteries in which typical alloys are used. The listed results reveal that the addition of Cd provides an improved cycle life where deep discharge is involved, the optimum amount of Cd being 0.002 to 1.0%. With less than 0.001 of Cd present, an insufficient effect will result, whereas use of more than 3.0% of Cd leads to a shorter life due to internal short-circuiting.

Since Cd has a high vapor pressure and vigorously evaporates even at relatively low temperatures, it is difficult to control the Cd content in the alloy. To overcome this difficulty, we have made various investigations and found that the evaporation of Cd is controllable by preparing an Sn-Cd alloy first and adding the alloy to Pb although the reason why such an effect can be achieved still remains to be proved.

Briefly, Al or Cu, when incorporated into Pb-Sn-As alloys, inhibits cracking. The use of Al- or Cu-containing alloys for the grids of lead-acid batteries ensures reduced self-discharge than Pb-Sb alloys, reduces the frequency of replenishment of water needed and provides a longer cycle life than Pb-Ca alloys when deep discharge is involved. The use of Cd is further effective in affording a still improved life. However, the use of Al is more advantageous than the use of Cu since Cu requires a longer time when forming alloys with Pb and Cu-containing alloys permit slightly greater self-discharge than Al-containing alloys. When the alloys of this invention are produced, the cast alloy is cooled with water upon withdrawal from the mold, then heat-treated at a temperature of 50° to 200° C. and thereafter slowly cooled. These steps impart increased corrosion resistance and enhanced deflection strength to the alloy. For the production of Cd-containing alloys, a Cd-Sn alloy is made first and the alloy is then admixed with Pb, whereby the evaporation of Cd can be inhibited. This serves to control the pollution to be otherwise encountered and precludes variations in the composition of alloys. The features of the present invention described above are of immense value for industrial purposes.

What we claim is:

1. A lead alloy for use in lead-acid batteries consisting of 0.1 to 3.0% by weight of tin, 0.1 to 0.3% by weight of arsenic, 0.01 to 0.1% by weight of aluminum or copper and the balance lead.

2. A lead alloy as defined in claim 1 further consisting of 0.002 to 1.0% by weight of cadmium.

3. A process for producing a lead alloy for use in lead-acid batteries comprising the steps of placing a molten alloy into a mold, the alloy consisting 0.1 to 3.0% by weight of tin, 0.1 to 0.3% by weight of arsenic, 0.01 to 0.1% by weight of aluminum or copper and the balance lead, quenching the alloy with a cooling medium having a temperature of up to 50° C. after releasing the alloy from the mold, heat-treating the alloy at a temperature of 50° to 200° C. and slowly cooling the alloy.

4. A process as defined in claim 3 wherein the cooling medium is water, and the heat-treated alloy is slowly cooled in air.

5. A process as defined in claim 3 wherein the lead alloy contains 0.002 to 1.0% by weight of cadmium, and the cadmium is incorporated into the alloy by forming an alloy of cadmium and tin and adding the cadmium-tin alloy to lead to form the lead alloy.

* * * * *

UNITED STATES PATENT AND TRADEMARK OFFICE
CERTIFICATE OF CORRECTION

PATENT NO. : 4,207,097
DATED : June 10, 1980
INVENTOR(S) : SADAO FUKUDA ET AL

It is certified that error appears in the above—identified patent and that said Letters Patent is hereby corrected as shown below:

Title Page, after [30] Foreign Application Priority Data, add the following:
Aug. 29, 1978 [JP]   Japan................53-106146

Col. 12, line 53, after "consisting", insert -- of --.

Signed and Sealed this

Seventh Day of October 1980

[SEAL]

Attest:

SIDNEY A. DIAMOND

Attesting Officer

Commissioner of Patents and Trademark